(12) United States Patent
Chen

(10) Patent No.: US 6,293,375 B1
(45) Date of Patent: Sep. 25, 2001

(54) PERMANENT MAGNET BRAKE MECHANISM

(76) Inventor: Chun-Feng Chen, 7F-6, No. 59, Sec. 2, San Min Road, Taichung City (TW)

( * ) Notice: Subject to any disclaimer, the term of this patent is extended or adjusted under 35 U.S.C. 154(b) by 0 days.

(21) Appl. No.: 09/578,709

(22) Filed: May 26, 2000

(51) Int. Cl.$^7$ ....................................................... F16F 15/03
(52) U.S. Cl. ........................................... 188/164; 188/161
(58) Field of Search ................................... 188/161, 164, 188/267.1, 267.2

(56) References Cited

U.S. PATENT DOCUMENTS 6,186,290 * 2/2001 Carlson ................................. 188/164

* cited by examiner

Primary Examiner—Christopher P. Schwartz
Assistant Examiner—C. T. Bartz
(74) Attorney, Agent, or Firm—Dougherty & Troxell

(57) ABSTRACT

A permanent magnet brake mechanism comprised of a permanent magnet, a guide ring, bearings inside a neck, a single-direction flywheel assembly of a rotatable outer hub disposed adjacent to the neck, a main shaft inserted through the bearings mounted in the rotatable outer hub, a sliding seat sleeved onto the main shaft and that is situated within the interior spatial confines at one side of the outer hub, a return spring installed at the exterior side of the sliding seat and on the main shaft that is also situated between the main shaft and the sliding seat, a brake line that is connected to the sliding seat and, furthermore, controls the movement of the sliding seat, and a guide key at interior side of the brake line that provides for the positioning of a mounting frame when the sliding seat slides along the main shaft. The innovative feature is that the permanent magnet is annularly disposed along the outer circumference of the sliding seat, with the outer lateral surface and the top surface of the permanent magnet coupled to the guide ring following the same outer circumference such that during the permanent magnet and guide ring coupling operation process, unitary construction heat dissipation elements capable of effective cooling are formed and, furthermore, situated between the interior side of the rotatable outer hub and the sliding seat.

4 Claims, 6 Drawing Sheets

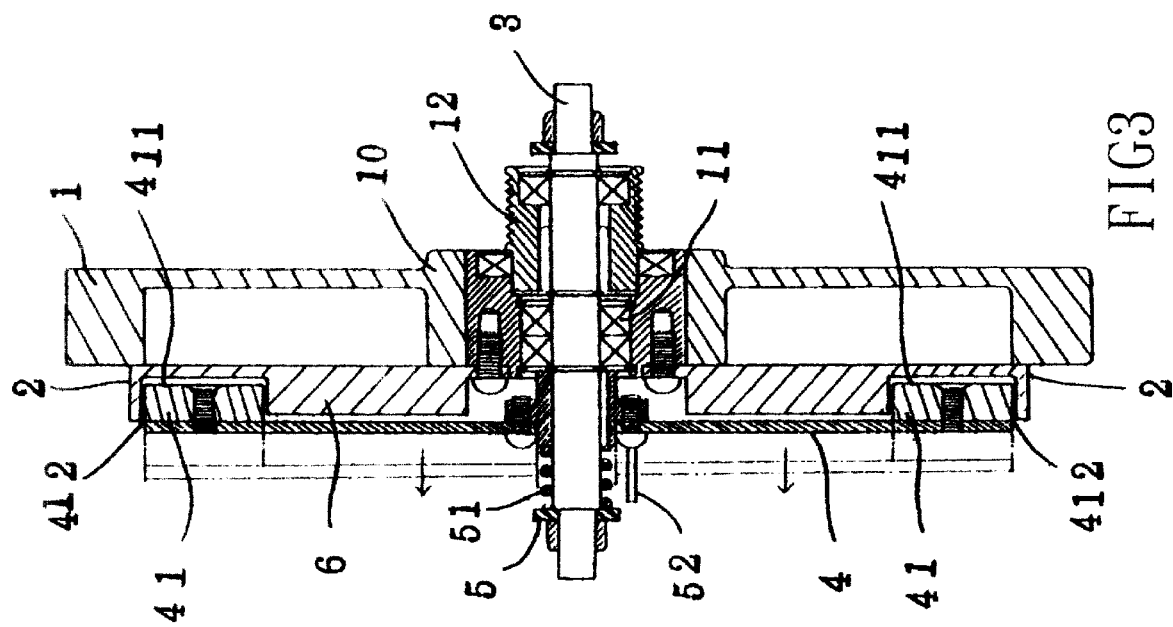
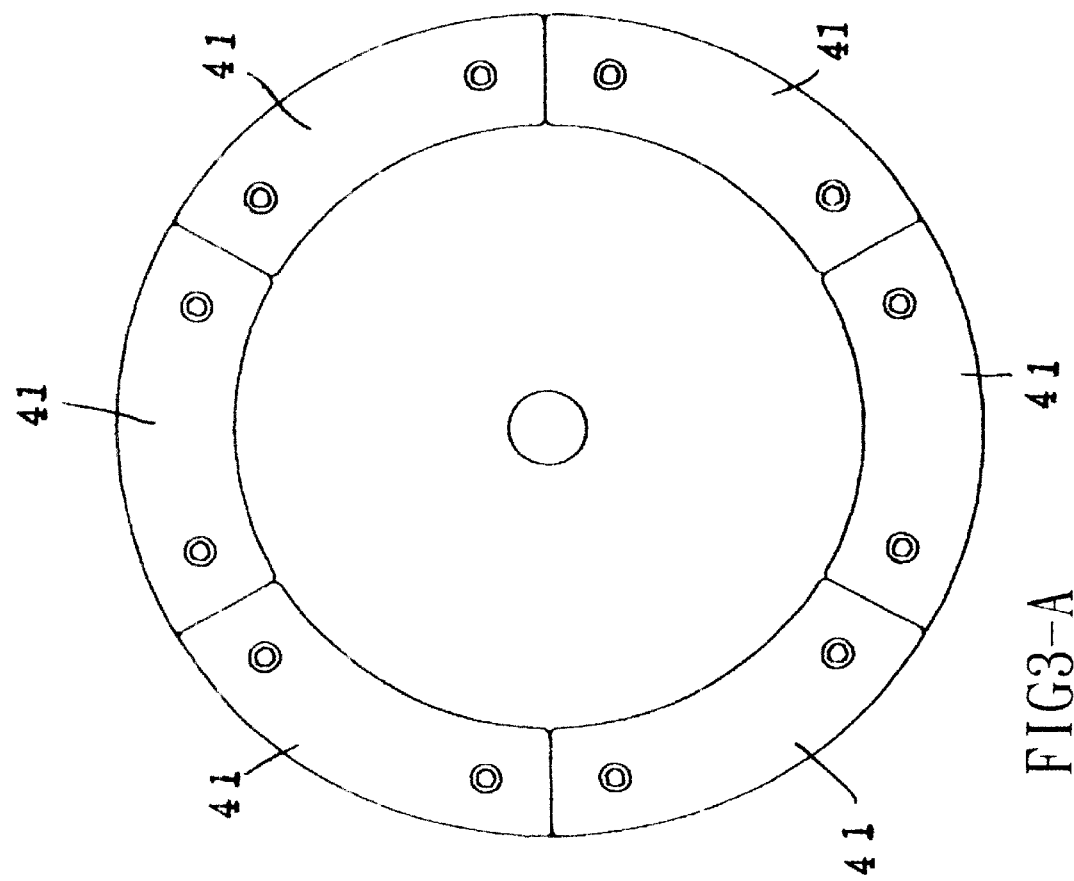

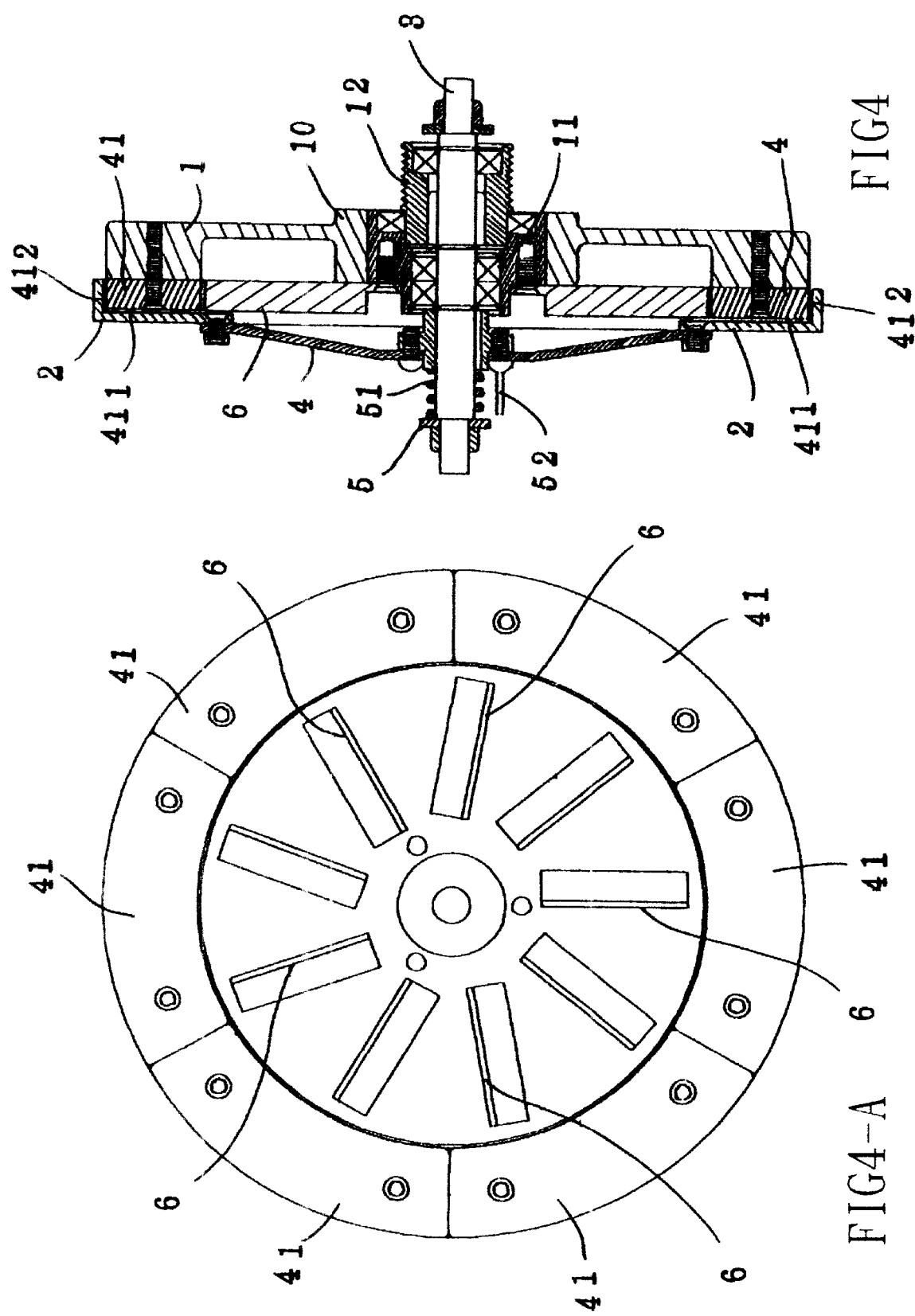

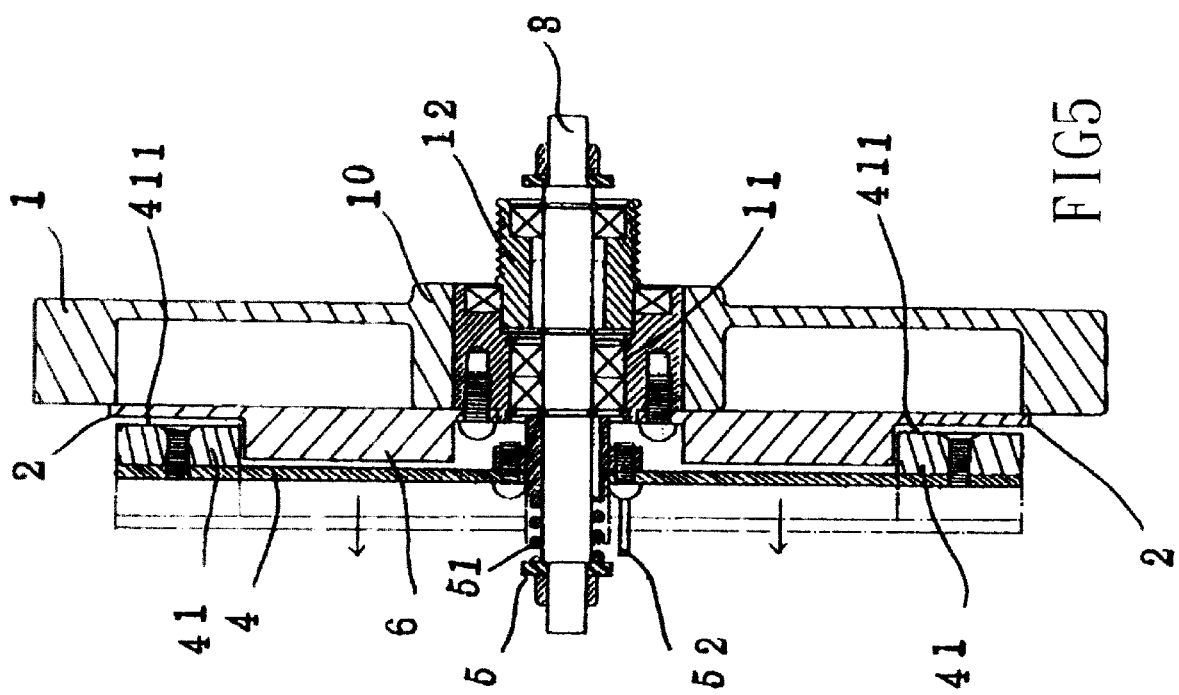
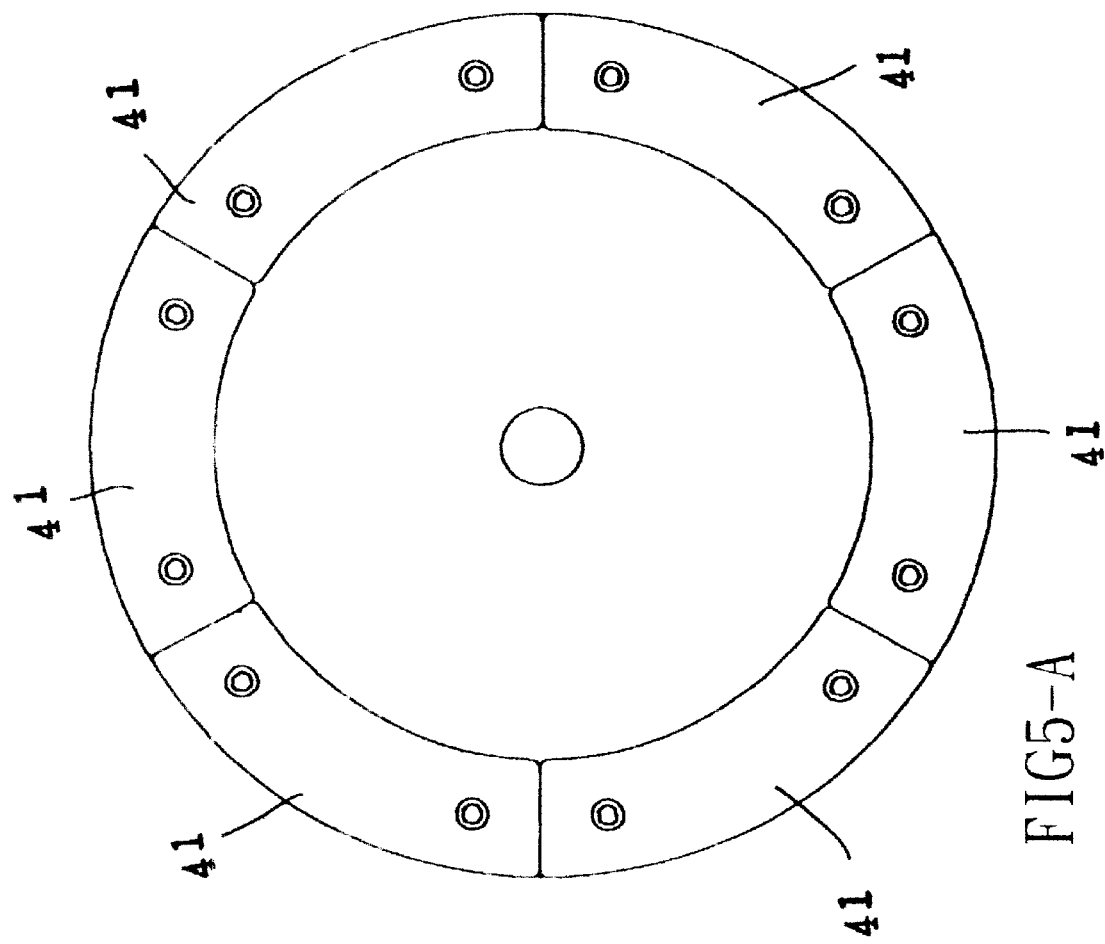

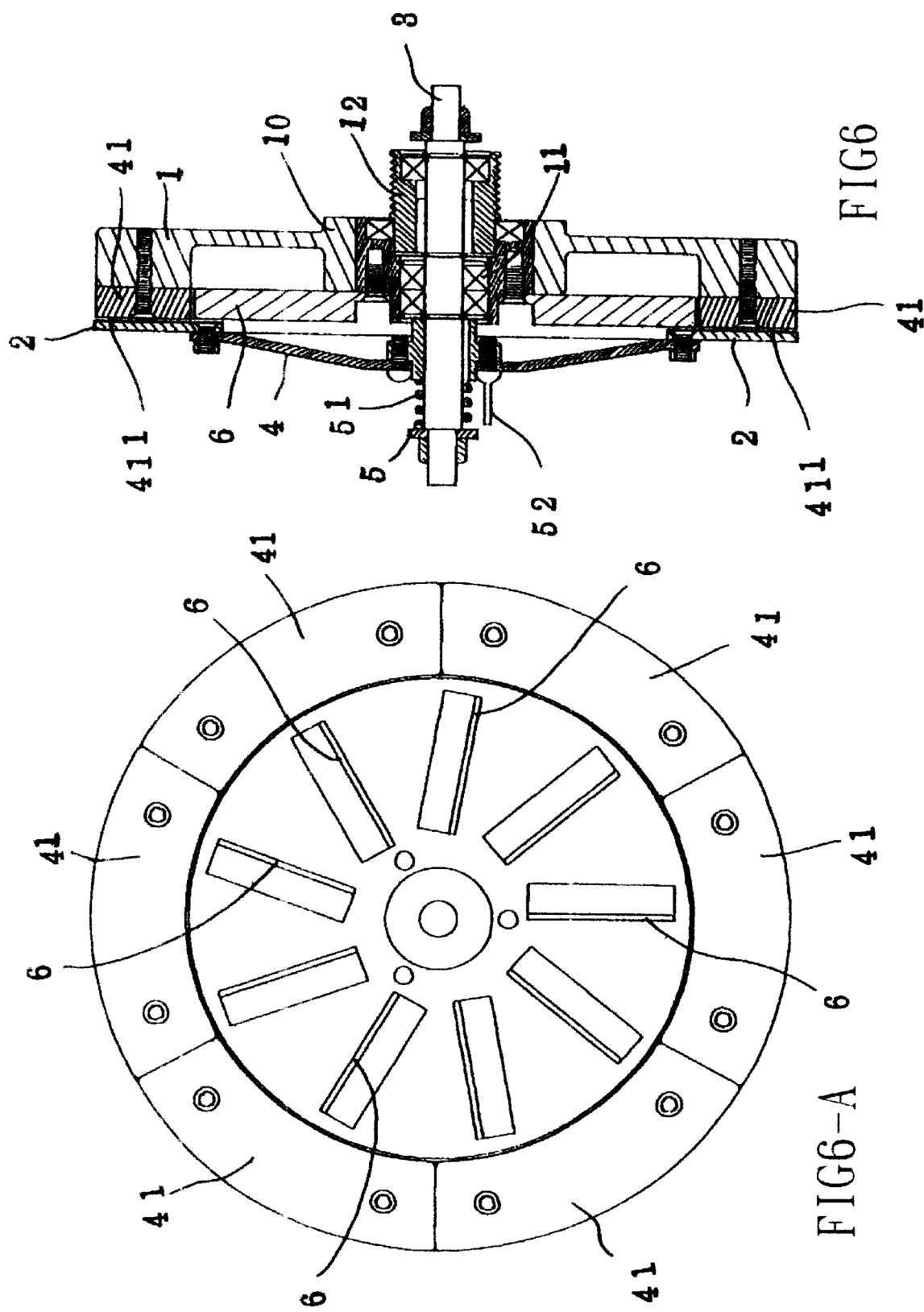

PERMANENT MAGNET BRAKE MECHANISM

BACKGROUND OF THE INVENTION

1) Field of the Invention

The invention herein relates to a permanent magnet brake mechanism for general applications such as a brake mechanism on health and therapeutic exercise machines that provides for simplified structural assembly and installation, stable performance and, furthermore, an complete structure in which the brake torque adjustment is continuous and stepless.

2) Description of the Prior Art

The brake mechanisms on current exercise machines or therapeutic machines are typically friction- and hydraulic-type or electric fan- or generator-based units; of these, the shortcomings of friction-type brake devices include wear and unstable braking (loading), the drawbacks of hydraulic-type brake devices include oil leakage, noise, and reduced braking at high temperatures; the defects of electric fan-based devices include overly large dimensions, unattractive appearance, a narrow load range, and difficult adjustment; and the negative aspects of the generator-based devices are structural complexity and high purchase prices.

Referring to FIG. 1 and FIG. 2, since the product structure of the currently marketed, manufacturer researched and developed "Permanent Magnet-type Adjustable Brake Device" utilizes an electrical conductor to vary the magnetic flux, back electromagnetic force (EMF) is generated in the circuit of the electrical conductor, producing local current or so-called eddy currents; according to Lenz's Law, the direction of the eddy currents sets up a reverse current flow that varies the original magnetic flux, with the square ratio of the directional torque and flux density permeating the air calculated using Maxwell's equation.

Based on the foregoing fundamental principle, the permanent magnet-type adjustable brake device of the said disclosure is comprised of bearings 11 inside a neck 10, a single-direction flywheel assembly 12 of a rotatable outer hub 1 disposed adjacent to the neck 10, a main shaft 3 inserted through the bearings 11 mounted in the rotatable outer hub 1, a sliding seat 4 sleeved on the main shaft 3 and situated within the interior spatial confines of the rotatable outer hub 1 and, furthermore, has a permanent magnet 41 along its outer circumference, with the sliding seat 4 also positioned on the outer side of the main shaft 3 and, furthermore, a return spring 51 installed between the main shaft 3 and the sliding seat 4, a brake line 52 that is connected to the sliding seat 4 and, furthermore, controls the movement of the sliding seat 4, and a minimum of one guide key 53 at the interior side of the brake line 52 that provides for the positioning of a mounting frame 5 when the sliding seat 4 slides along the main shaft 3; an annular groove 13 of an indented profile is formed along the circumferential edge of the said rotatable outer hub 1 that accommodates the entry of the permanent magnet 41 of the sliding seat 4 and, furthermore, a guide ring 2 is situated along both the upper and lower interior surfaces of the said annular groove 13 such that when the said structural components are assembled, the upper and lower surfaces of the permanent magnet 41 become physically coupled which increases the unit loading capacity and enables a reduction of structural dimensions.

In the said structural assembly, although the upper and lower surfaces of the permanent magnet 41 are physically coupled to thereby increase the unit loading capacity and reduce the structural dimensions, since an annular groove 13 of an indented profile must be formed along the circumferential edge of the said rotatable outer hub 1, the initial fabrication of the rotatable outer hub 1 involves an inexpedient finishing procedure and after the annular indentation is formed in the surface, the guide ring 2 must be inserted inside which similarly results in assembly inconveniences; notably, when the brake line 52 is pulled to control the movement of the sliding seat 4, this causes the permanent magnet 41 along its circumferential edge to be extended in or out of the indented profile of the annular groove 13 in a reciprocal path of operational movement, thereby enabling the variation of the coupling surface area size between the permanent magnet 41 and the guide ring 2 and proportionately varying the magnetic flux density, with the process producing an increase in temperature that cannot be effectively diverted or dissipated that seriously decreases the quality of powderized metal permanent magnets and thus adversely affects the objectives and performance of the entire structure.

Therefore, to remedy the said shortcomings of the conventional structure, the inventor of the invention herein, based on many years of experience gained while engaged in the marketing and production of various types of health and therapeutic exercise machines as well as after-sales consumer feedback, conducted extensive research that was additionally supported by research results accumulated from manufacturing experience which culminated in the successful completion of the invention herein and its submittal for purposes of patent application.

SUMMARY OF THE INVENTION

The primary objective of the invention herein is to provide a permanent magnet brake mechanism of a very simple structure that is simple to assemble and install, but which has increased unit load capacity and provides for effective heat dissipation during the coupling control process of the permanent magnet and the guide ring, with the increased effective coupling surface area between the entire guide ring and the permanent magnet not only affording more control over the brake torque and efficient cooling between the two components during the coupling operation process, but also continuous and stepless brake torque adjustment.

To further understand the structure, innovative features, and operation of the invention herein for purposes of review and reference, the brief description of the drawings below is followed by the detailed description of the invention.

BRIEF DESCRIPTION OF THE DRAWINGS

FIG. 3 is a cross-sectional drawing of the invention herein.

FIG. 3-A is an orthographic drawing of the invention herein (as viewed from a lateral perspective to show the permanent magnet and heat dissipation element sections).

FIG. 4 is a cross-sectional drawing of another embodiment of the invention herein.

FIG. 4-A is a cross-sectional drawing of another embodiment of the invention herein (as viewed from a lateral perspective to show the permanent magnet and heat dissipation element sections).

FIG. 5 is a cross-sectional drawing of another embodiment of the invention herein.

FIG. 5-A is a cross-sectional drawing of another embodiment of the invention herein (as viewed from a lateral perspective to show the permanent magnet and heat dissipation element sections).

FIG. 6 is a cross-sectional drawing of another embodiment of the invention herein.

FIG. 6-A is a cross-sectional drawing of another embodiment of the invention herein (as viewed from a lateral perspective to show the permanent magnet and heat dissipation element sections).

DETAILED DESCRIPTION OF THE INVENTION

Figure 1:
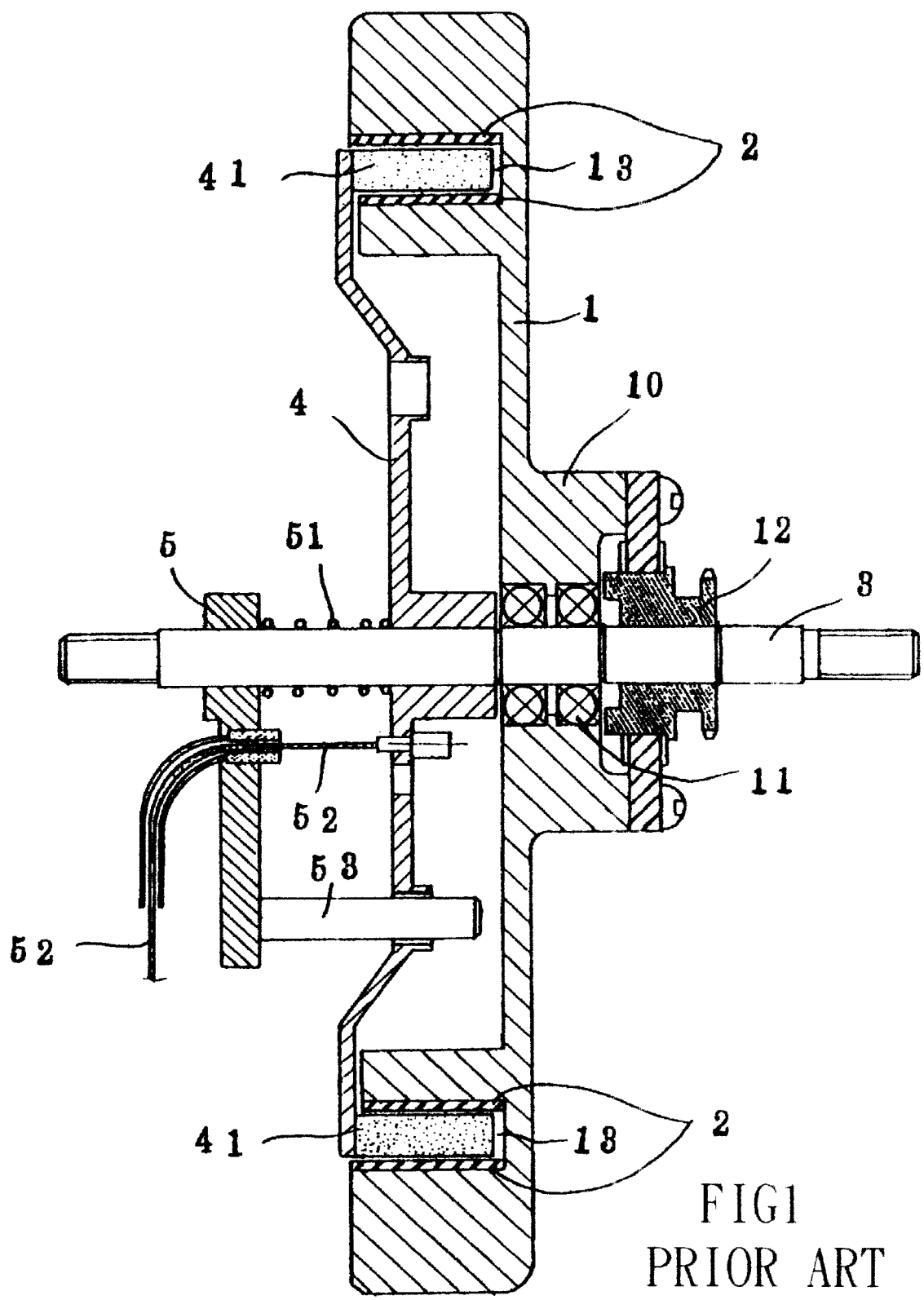
FIG. 1 is a cross-sectional drawing of a conventional structure, with the components in their respective positions.
Figure 2:
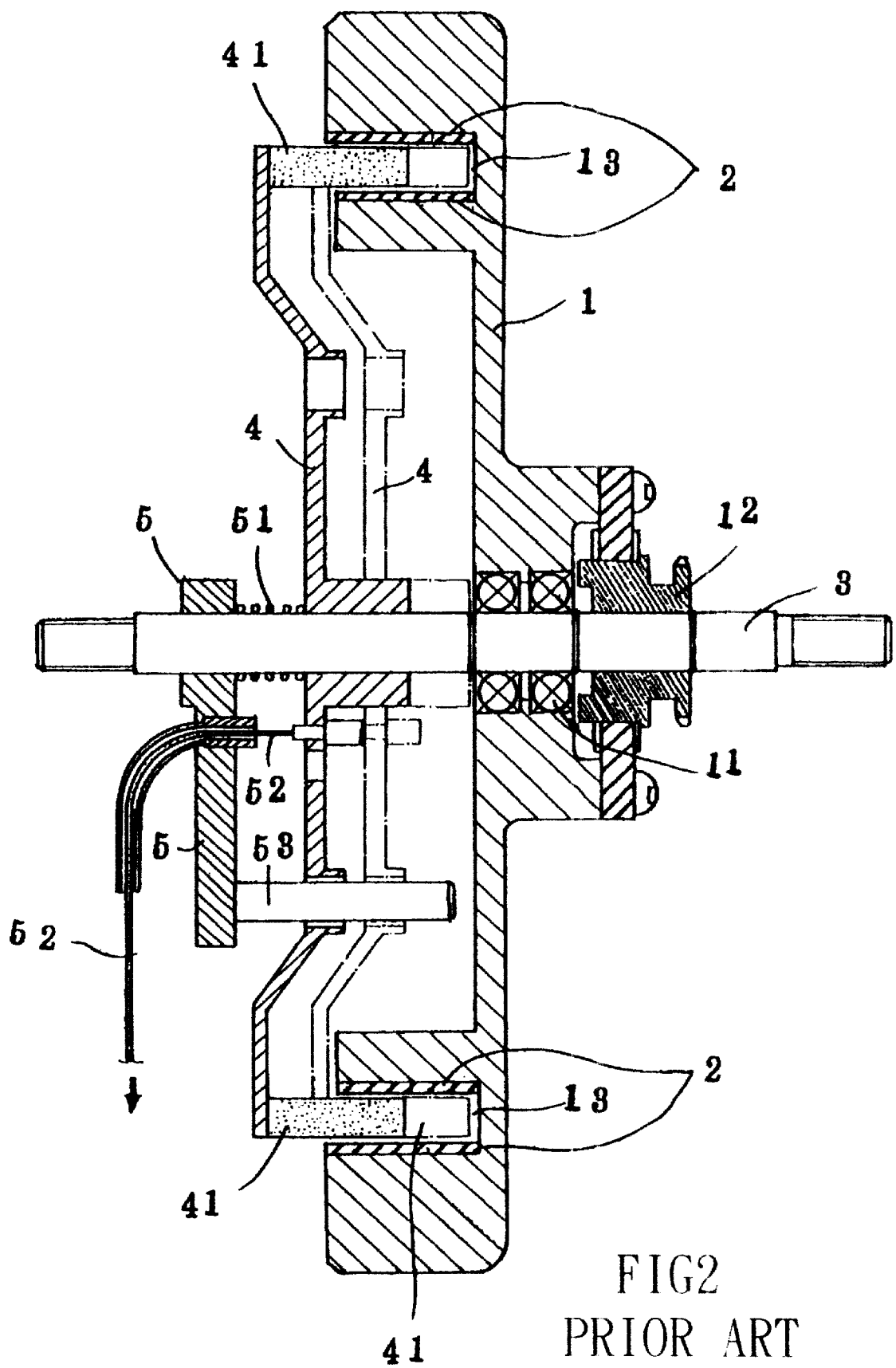
FIG. 2 is a cross-sectional drawing of a conventional structure, with the components in their respective operational positions.

Referring to FIG. 3 and FIG. 3-A, the structure of the invention herein is comprised of a permanent magnet 41, a guide ring 2, bearings 11 inside a neck 10, a single-direction flywheel assembly 12 of a rotatable outer hub 1 disposed adjacent to the neck 10, a main shaft 3 inserted through the bearings 11 mounted in the rotatable outer hub 1, a sliding seat 4 sleeved onto the main shaft 3 and that is situated within the interior spatial confines at one side of the outer hub 1, a return spring 51 installed at the exterior side of the sliding seat 4 and on the main shaft 3 that is also situated between the main shaft 3 and the sliding seat 4, a brake line 52 that is connected to the sliding seat 4 and, furthermore, controls the movement of the sliding seat 4, and a guide key 53 at the interior side of the brake line 52 that provides for the positioning of a mounting frame 5 when the sliding seat 4 travels along the main shaft 3; the most innovative feature of the present invention is that the permanent magnet 41 is annularly disposed along the outer circumference of the sliding seat 4, with the outer lateral surface 411 and the top surface 412 of the permanent magnet 41 coupled to the guide ring 2 following the said circumference such that during the permanent magnet 41 and guide ring 2 coupling operation process, unitary construction heat dissipation elements 6 capable of effective cooling are formed and, furthermore, situated between the interior side of the rotatable outer hub 1 and the sliding seat 4.

In the said structural assembly, when the brake lines 52 are pulled, this controls the movement of the sliding seat 4 and varies the effective coupling surface area between the permanent magnet 41 and the guide ring 2; when the sliding seat 4 is moved outward, the guide ring 2 effects a proportionate decrease in the magnetic flux of the permanent magnet 41; conversely, when the brake line 52 is released and the sliding seat 4 is restored inward by the return spring 51, the guide ring 2 effects a proportionate increase in the magnetic flux of the permanent magnet 41, thereby providing for the variation and control of magnetic flux density to achieve an adjustable magnitude of brake torque.

Since the permanent magnet 41 of the invention herein is directly fastened to the outer circumference of the sliding seat 4 and a variable magnetic flux density by the similarly postured guide ring 2 is provided during the coupling control process of the permanent magnet 41 in conjunction with the guide ring 2 in which unitary construction heat dissipation elements 6 capable of effective cooling are directly situated between the interior side of the rotatable outer hub 1 and the sliding seat 4, therefore, in addition to improving upon the fabrication, assembly, and heat dissipation difficulties of the conventional structure, the assembly and installation of the overall structure is simplified such that there is effective coupling between the guide ring 2 and the permanent magnet 41 which not only allows for control over the magnitude of brake torque and, furthermore, effective heat dissipation of the two components during the coupling operation process, but the brake torque thereby produced can also be continuously and steplessly adjusted.

Furthermore, referring to FIG. 4 and FIG. 4-A, the permanent magnet 41 can be alternatively disposed along the outer circumference of the rotatable outer hub 1, with the guide ring 2 situated along the circumferential edge at the end of the sliding seat 4 and the outer lateral surface 411 and the top surface 412 of the entire permanent magnet 41 coupled to the outer circumference of the said guide ring 2 such that heat dissipation elements 6 are similarly situated between the bottom surface of the permanent magnet 41 circumferentially disposed on the interior side of the rotatable outer hub 1 and the sliding seat 4, thereby achieving simplified assembly and installation, stable performance and, furthermore, an entire structure in which brake torque can be continuously and steplessly adjusted.

Furthermore, referring to FIG. 3-A, the entire permanent magnet 41 can consist of a plurality of assembled arc-shaped blocks such that the permanent magnet 41 is formed by their flush placement into a contiguous circle or placed intervalicly to achieve the annular arrangement needed to control the size of the coupling surface area between them and the guide ring 2 and thereby effectively provide for a controllable magnitude of brake torque.

Additionally, referring to FIG. 5 and FIG. 6, the guide ring 2 can be assembled such that it is directly coupled to the outer lateral surface 411 of the permanent magnet 41 to provide for utilizations requiring a lesser magnitude of brake torque such as for health or therapeutic exercise machine brake mechanisms.

In summation of the foregoing structure, since its mechanism is simplified and effective enhanced, the invention herein meets new patent application requirements and is hereby submitted to the patent bureau for review and the granting of the commensurate patent rights.

What is claimed is:

1. A permanent magnet brake mechanism comprised of a permanent magnet, a guide ring, bearings inside a neck, a single-direction flywheel assembly of a rotatable outer hub disposed adjacent to the said neck, a main shaft inserted through the bearings mounted in the said rotatable outer hub, a sliding seat sleeved onto the said main shaft and that is situated within the interior spatial confines at one side of the said outer hub, a return spring installed at the exterior side of the said sliding seat and on the said main shaft that is also situated between the said main shaft and the said sliding seat, a brake line that is connected to the said sliding seat and, furthermore, controls the movement of the said sliding seat, and a guide key at interior side of the said brake line that provides for the positioning of a mounting frame when the said sliding seat slides along the said main shaft, the innovative feature of which is that the said permanent magnet is annularly disposed along the outer circumference of the said sliding seat, with the outer lateral surface and the top surface of the said permanent magnet coupled to the said guide ring following the said circumference such that during the said permanent magnet and said guide ring coupling operation process, unitary construction heat dissipation elements capable of effective cooling are formed and, furthermore, situtated between the interior side of the said rotatable outer hub and the said sliding seat such that the said structural assembly provides for simplified assembly and installation, stable performance and, furthermore, an entire structure in which brake torque can be continuously and steplessly adjusted.

2. The invention as defined in claim 1 wherein, the said permanent magnet can be alternatively disposed along the outer circumference of the said rotatable outer hub, with the said guide ring situated along the circumferential edge at the end of the said sliding seat and the said outer lateral surface and the said top surface of the entire said permanent magnet coupled to the outer circumference of the said guide ring such that said heat dissipation elements are similarly situated between the bottom surface of the said permanent magnet circumferentially disposed on the interior side of the said rotatable outer hub and the said sliding seat, thereby achieving simplified assembly and installation, stable performance and, furthermore, an entire structure in which brake torque can be continuously and steplessly adjusted.

3. The invention as defined in claim 1 wherein, the entire said permanent magnet can consist of a plurality of assembled arc-shaped blocks such that the said permanent magnet is formed by their flush placement into a contiguous circle placed to achieve the annular arrangement needed to control the size of the coupling surface area between them and the said guide ring and thereby effectively provide for a controllable magnitude of brake torque.

4. The invention as defined in claim 1 wherein, the said guide ring can be assembled such that it is directly coupled to the said outer lateral surface of the said permanent magnet to provide for applications requiring a lesser magnitude of brake torque such as for health or therapeutic exercise machine brake mechanisms.

* * * * *